(12) United States Patent
Randall (10) Patent No.: US 11,752,709 B2
(45) Date of Patent: Sep. 12, 2023

(54) REINFORCING STRUCTURE FOR A WIND TURBINE BLADE

(71) Applicant: Vestas Wind Systems A/S, Aarhus N. (DK)

(72) Inventor: Stephen Randall, Cowes (GB)

(73) Assignee: Vestas Wind Systems A/S, Aarhus N (DK)

( * ) Notice: Subject to any disclaimer, the term of this patent is extended or adjusted under 35 U.S.C. 154(b) by 381 days.

(21) Appl. No.: 16/349,749

(22) PCT Filed: Nov. 15, 2017

(86) PCT No.: PCT/DK2017/050377
§ 371 (c)(1),
(2) Date: May 14, 2019

(87) PCT Pub. No.: WO2018/091054
PCT Pub. Date: May 24, 2018

(65) Prior Publication Data
US 2019/0270261 A1  Sep. 5, 2019

(30) Foreign Application Priority Data
Nov. 17, 2016 (DK) .......................... PA 2016 70914

(51) Int. Cl.
*B29D 99/00* (2010.01)
*B29C 70/34* (2006.01)
(Continued)

(52) U.S. Cl.
CPC .......... *B29C 70/342* (2013.01); *B29C 70/443* (2013.01); *B29C 70/521* (2013.01);
(Continued)

(58) Field of Classification Search
CPC .. B29C 70/443; F03D 1/0675; B29D 99/0028
See application file for complete search history.

(56) References Cited

U.S. PATENT DOCUMENTS

| 6,286,281 B1 | 9/2001 | Johnson |
| 2012/0107553 A1 | 5/2012 | Appleton et al. |

(Continued)

FOREIGN PATENT DOCUMENTS

| CN | 2142783 Y | 9/1993 |
| CN | 1317072 A | 10/2001 |

(Continued)

OTHER PUBLICATIONS

China National Intellectual Property Administration, First Notification of Office Action in CN Application No. 201780082797, dated Sep. 16, 2020.

(Continued)

*Primary Examiner* — Alison L Hindenlang
*Assistant Examiner* — Alexander A Wang
(74) *Attorney, Agent, or Firm* — Wood Herron & Evans LLP (57) ABSTRACT

A reinforcing structure for a wind turbine blade A reinforcing structure for a wind turbine blade (12) is described. The reinforcing structure comprises one or more pultruded strips (42C) having spanwise grooves (54). The grooves (54) impart transverse flexibility to the strips (42C), allowing the strips (42C) to conform to the curvature of a wind turbine blade mould (44). An associated method of making a reinforcing structure for a wind turbine blade (12) is described. The method comprises providing an elongate mould (44) extending in a longitudinal direction and defining a mould surface at least part of which is concave-curved in transverse cross section. One or more pultruded strips (42C) with spanwise grooves (54) are arranged in the mould (44) to form the reinforcing structure. The pultruded strip(s) are bent along the grooves (54) so that they substantially conform to the transverse curvature of the mould surface. In (Continued)

preferred embodiments the reinforcing structure is a spar cap (36).

7 Claims, 8 Drawing Sheets

(51) Int. Cl.
B29C 70/44 (2006.01)
B29C 70/52 (2006.01)
B29C 70/54 (2006.01)
F03D 1/06 (2006.01)
B29L 31/08 (2006.01)
B29C 53/04 (2006.01)

(52) U.S. Cl.
CPC .......... B29C 70/526 (2013.01); B29C 70/547 (2013.01); B29D 99/001 (2013.01); B29D 99/0028 (2013.01); F03D 1/0675 (2013.01); B29C 53/04 (2013.01); B29L 2031/085 (2013.01); Y02E 10/72 (2013.01); Y02P 70/50 (2015.11)

(56) References Cited

U.S. PATENT DOCUMENTS

| | | |
|---|---|---|
| 2013/0149166 A1 | 6/2013 | Schibsbye |
| 2014/0301859 A1 | 10/2014 | Hancock et al. |
| 2016/0273516 A1 | 9/2016 | Smith et al. |
| 2017/0002792 A1 | 1/2017 | Yarbrough et al. |
| 2018/0058422 A1* | 3/2018 | Yarbrough ............ F03D 1/0675 |

FOREIGN PATENT DOCUMENTS

| | | |
|---|---|---|
| CN | 101446263 A | 6/2009 |
| CN | 102458823 A | 5/2012 |
| CN | 202915815 U | 5/2013 |
| CN | 105899803 A | 8/2016 |
| JP | S56117623 A | 9/1981 |
| WO | 2010063438 A3 | 3/2011 |
| WO | 2014079456 A1 | 5/2014 |

OTHER PUBLICATIONS

Danish Patent and Trademark Office, Search and Examination Report in PA 2016 70914, dated May 17, 2017.
European Patent Office, International Search Report and Written Opinion in PCT Application No. PCT/DK2017/050377, dated Feb. 12, 2018.
China National Intellectual Property Administration, 2nd Notification of Office Action in CN Application No. 201780082797, dated Jul. 9, 2021.
European Patent Office, Examination Report in EP Application No. 17801341.3, dated Apr. 7, 2022.

* cited by examiner

REINFORCING STRUCTURE FOR A WIND TURBINE BLADE

TECHNICAL FIELD

The present invention relates generally to reinforcing structures such as spar caps for wind turbine blades, and to methods of making such reinforcing structures.

BACKGROUND

Modern wind turbine blades typically comprise a fibreglass outer shell and one or more load-bearing reinforcing structures such as spar caps. Spar caps are structural beams that typically run along the full length or a majority of the length of the blade and carry the bending loads. Spar caps are typically integrated with the outer shell of the blade, for example they may be embedded within the structure of the outer shell, or bonded to an inner surface of the shell.

It is known to form spar caps from strips of fibre-reinforced polymeric material, such as carbon-fibre reinforced plastic (CFRP). For example, a known spar cap comprises a stack of substantially flat CFRP strips, which are bonded together by cured resin. The carbon strips are typically formed in a pultrusion process, which involves drawing resin-coated carbon fibres through a substantially rectangular pultrusion die in a continuous process. This produces strips of constant substantially rectangular cross-section. For industrial-scale wind turbine blades, the strips may each be in excess of 80 metres in length.

Wind turbine blades are typically produced in long blade moulds that are shaped to define the outer contour of the blade. The mould surface is concave-curved in transverse cross-section, with the curvature being most pronounced at the root end of the mould where the mould surface is circular or part circular. There is a continuing trend to produce wind turbine blades of increasing size in order to capture more energy from the wind. Larger blades often require wider spar caps. However, wider spar caps may not be capable of conforming well to the curvature of the blade mould and/or may be relatively expensive to produce.

Against this background, the present invention aims to provide a cost efficient reinforcing structure and an associated method of making a reinforcing structure.

SUMMARY OF THE INVENTION

According to an aspect of the present invention there is provided a method of making a reinforcing structure for a wind turbine blade. The method comprises: providing an elongate mould extending in a longitudinal direction and defining a mould surface at least part of which is concave-curved in transverse cross section; arranging one or more pultruded strips in the mould to form the reinforcing structure, the pultruded strip(s) having one or more longitudinally-extending grooves; and bending and/or cracking the pultruded strip(s) along the one or more grooves such that the pultruded strip(s) substantially conform to the transverse curvature of the mould surface.

The longitudinally-extending grooves of the pultruded strip impart transverse flexibility to the strip, allowing it to bend or flex in a plane perpendicular to its length, i.e. perpendicular to a direction of longitudinal extension of the strip. The grooves therefore allow the strip to adapt or conform to the transverse curvature of the mould. This allows relatively wide strips to be used even in areas of the mould with high degrees of curvature.

In some cases, bending the strip along the one or more grooves may cause the strip to crack along the groove(s). The cracked strip may therefore become divided into multiple sections. When bent or cracked along the one or more grooves, the strip substantially conforms to the transverse curvature of the mould surface. If the strip cracks along the grooves, the cracks may 'heal', i.e. fill with resin for example during a subsequent resin infusion process.

The invention is particularly suited to the production of relatively wide reinforcing structures, for example relatively wide spar caps that are suited for use in single-web blades where the primary load-bearing structure of the blade comprises a single shear web arranged between a pair of opposed spar caps. Whilst it is possible to produce wide spar caps that conform to the curvature of the mould by using relatively narrow pultrusions arranged side-by-side in the transverse direction, it is significantly cheaper to produce a wide pultruded strip having a width equal to the combined width of such narrower pultrusions. It is also cheaper to handle, transport and store fewer wider pultrusions. The present invention therefore represents a significant cost saving in comparison to this alternative option.

Whilst the reinforcing structure is preferably a spar cap, it may alternatively be any other reinforcing structure suitable for a wind turbine blade. The mould may be a wind turbine blade mould or a dedicated mould for forming the reinforcing structure, for example a spar cap mould. In the case that the mould is a wind turbine blade mould, the method may comprise forming the reinforcing structure, e.g. a spar cap, in situ and integrally with the shell of the blade. The reinforcing structure may therefore be embedded within the shell of the blade. Alternatively, if the reinforcing structure is made separately, for example in a dedicated mould, then it may subsequently be integrated with a shell of a wind turbine blade, for example by bonding the reinforcing structure to an inner surface of the shell.

The method may comprise stacking a plurality of the pultruded strips in the mould to form a stack. Each strip may be substantially flat in transverse cross section when it is initially stacked with the other strips. The method may further comprise bending and/or cracking the stack of strips in the mould along at least one groove of at least one strip such that the stack of strips substantially conforms to the transverse curvature of the mould surface.

The grooves may also enhance resin infusion within the mould by acting as resin channels to assist the flow of resin between the pultrusions.

The grooves may be provided on an upper surface and/or on a lower surface of the strip. Providing the grooves on the lower surface of the strip causes the grooves to widen when the strip flexes. This may advantageously maximise the space for resin to flow between stacked strips.

The method may comprise arranging one or more other structural materials in the mould such as layers of reinforcing fabric and/or core material such as foam.

The method may comprise at least partially covering the one or more strips with a vacuum bagging film to form a sealed region in the mould enclosing the one or more strips. Air may subsequently be removed from the sealed region. The evacuation of air from the sealed region causes the vacuum bagging film to contract around the components in the mould and exert a force on the strip(s) causing the strip(s) to bend and/or crack along the one or more grooves.

The one or more pultruded strips may be made from fibre-reinforced polymeric material. Preferably the strip(s) are made from carbon-fibre reinforced plastic (CFRP), which has a high strength to weight ratio. The strips may be formed from unidirectional fibres or fibres arranged in multiple directions. In the case of unidirectional fibres, the fibres preferably extend in the longitudinal direction of the strip. The grooves therefore may extend substantially parallel to the fibres, which is advantageous since it avoids significantly interrupting the longitudinal extension of the reinforcing fibres.

The inventive concept includes a reinforcing structure for a wind turbine blade made according to the method described above.

According to another aspect of the invention there is provided a method of making a wind turbine blade. The method comprises providing a wind turbine blade mould extending in a longitudinal direction and defining a mould surface at least part of which is concave-curved in transverse cross section. Arranging one or more pultruded strips of material in the mould to form a reinforcing structure of the blade, the pultruded strip(s) having one or more longitudinally-extending grooves; and bending and/or cracking the pultruded strip(s) along the one or more grooves such that the pultruded strip(s) conform to the transverse curvature of the mould surface.

The wind turbine blade mould may be shaped to form the whole wind turbine blade shell or part of the blade shell. For example, the mould may be designed to form a half shell of the blade, such as a windward half shell or a leeward half shell.

The wind turbine blade mould preferably extends in the longitudinal direction between a root end and a tip end, and extends in a transverse direction between a leading edge and a trailing edge. At least part of the mould surface is curved in the transverse direction.

According to another aspect of the present invention there is provided an elongate reinforcing structure for a wind turbine blade. The reinforcing structure comprises at least one pultruded strip having one or more longitudinally extending grooves.

The one or more longitudinally-extending grooves are preferably dimensioned so as to impart transverse flexibility to the strip.

The at least one strip may be bent in transverse cross-section along at least one of the grooves.

The strip may have a single groove or a plurality of substantially parallel grooves that are mutually spaced apart across a width of the strip. The one or more grooves serve to divide the cross-section of the strip into a plurality of distinct portions. When the strip is bent along the groove(s), these portions are each able to lie flat or flush against a curved surface, such as the surface of a mould. The transverse flexibility of the strip thus enables the strip to conform to curved moulds and to be incorporated into or with curved portions of a wind turbine blade shell.

The at least one strip may have a plurality of substantially parallel grooves that are mutually spaced apart across a width of the strip.

The elongate reinforcing structure may comprise a plurality of strips arranged in a stack.

Each strip may have one or more longitudinally extending grooves. One or more of the stacked strips is preferably bent in transverse cross-section along at least one of the grooves. The stack of strips is therefore able to conform to the curvature of a mould or wind turbine blade shell. Preferably all of the stacked strips are bent along their respective grooves.

The reinforcing structure is preferably a spar cap, but may be any other reinforcing structure for a wind turbine blade.

The inventive concept encompasses a wind turbine blade comprising the elongate reinforcing structure described above.

The reinforcing structure may be embedded within a shell of the wind turbine blade. Alternatively, the reinforcing structure may be bonded or otherwise attached to the shell.

According to a further aspect of the present invention, there is provided a pultruded strip of fibre-reinforced polymeric material for forming at least part of a spar cap for a wind turbine blade. The strip extends longitudinally and is substantially flat and of substantially uniform thickness along its length. The strip comprises one or more longitudinally-extending grooves.

The groove(s) are preferably dimensioned so as to impart transverse flexibility to the strip. To this end, the one or more grooves preferably has a depth along at least a majority of the length of the strip of at least 50% of the thickness of the strip.

The invention also provides a pultrusion process for making the pultruded strips. The process comprises drawing resin-coated reinforcing fibres through a pultrusion die of substantially rectangular cross-section. The pultrusion die comprises one or more protruding groove-forming features. The groove-forming features are preferably dimensioned to create longitudinally-extending grooves in the strip that have a depth of at least 50% of the thickness of the strip.

It will be appreciated that the various aspects and expressions of the invention set out above are interrelated. Accordingly optional and/or advantageous features described in connection with any one of these aspects apply equally to the other aspects, and may therefore be combined with any of these aspects. The same applies to the dependent claims, which are generally applicable to all aspects and expressions of the invention. Repetition of optional and advantageous features is generally avoided in the description and claims purely for reasons of conciseness.

DETAILED DESCRIPTION

Figure 1:
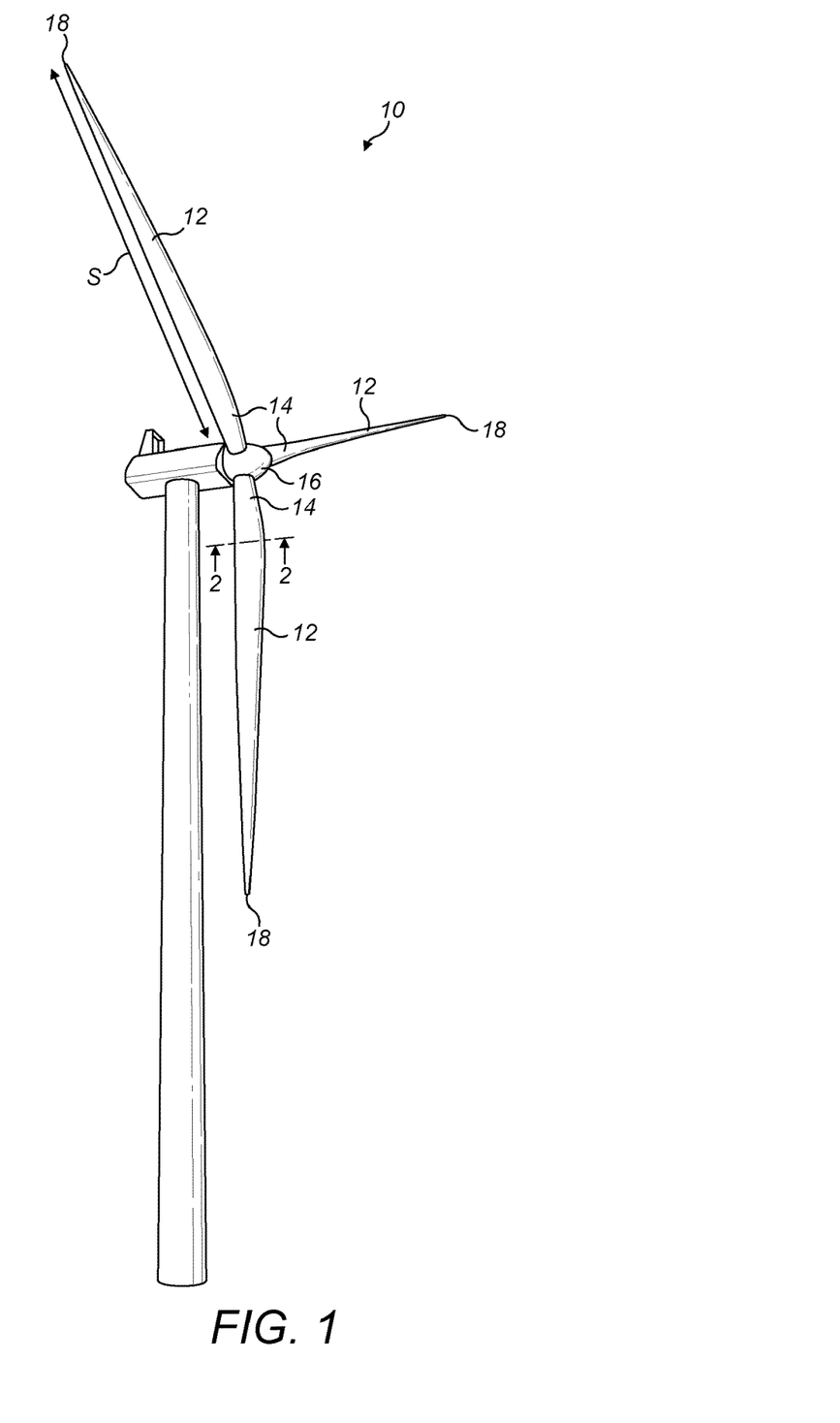
FIG. 1 shows a wind turbine comprising a plurality of wind turbine blades according to an embodiment of the present invention.

FIG. 1 shows a wind turbine 10 comprising a plurality of wind turbine blades 12. The blades 12 are connected at their respective root ends 14 to a wind turbine blade hub 16. Each blade 12 extends in a longitudinal or 'spanwise' direction S from its root end 14 to a tip end 18. Typically the blades 12 are substantially circular at their root ends 14, where they connect to the hub 16. The blades 12 then develop an airfoil profile in transverse cross-section moving in the spanwise direction S towards the tip 18.

Figure 2:
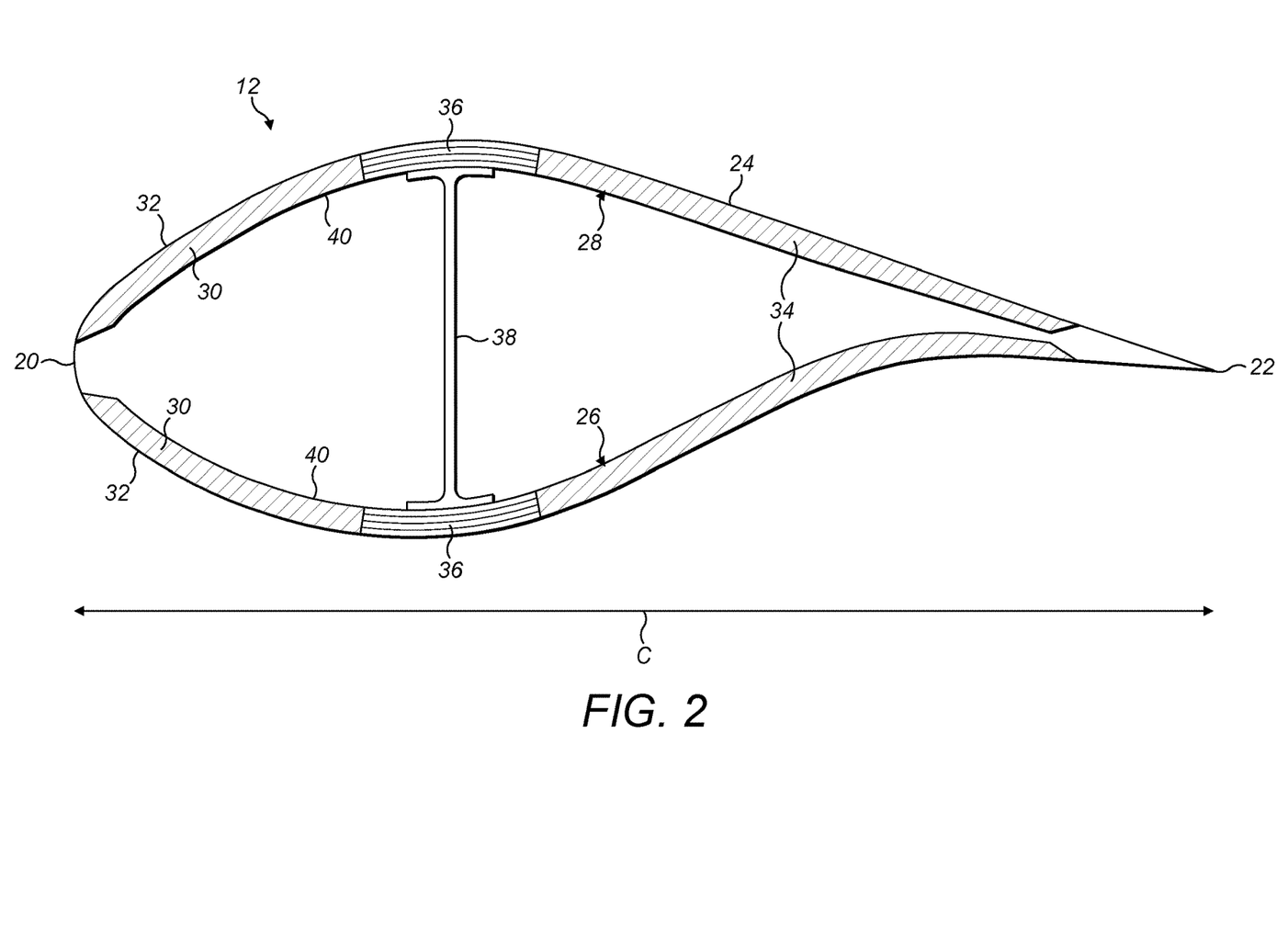
FIG. 2 is a cross-section through one of the wind turbine blades of FIG. 1.

FIG. 2 is a schematic transverse cross-sectional view of one of the wind turbine blades 12 of FIG. 1, taken along the line 2-2 in FIG. 1. It can be seen from FIG. 2 that the blade 12 has an airfoil profile in this region. The blade 12 extends in a 'chordwise' direction C between a leading edge 20 and a trailing edge 22. The blade 12 comprises an outer shell 24, which in this example is formed from a windward half-shell 26 and a leeward shell 28 that are bonded together along their leading and trailing edges 20, 22. The windward and leeward shells 26, 28 are both curved between their leading and trailing edges 20, 22 to define the airfoil profile of the blade 12. The windward and leeward shells 26, 28 may be made separately in respective half-moulds. However, in other embodiments, the outer shell 24 of the blade 12 may be formed as a single piece.

The outer shell 24 may be of composite construction, and typically comprises inner and outer skin layers 30, 32 made primarily of glass-fibre reinforced plastic (GFRP). For increased strength, core material 34 such as foam or balsa may be incorporated in the shell structure, for example between the inner and outer skin layers 30, 32, to form a sandwich structure.

The wind turbine blade 12 also comprises reinforcing structures. In this embodiment, the reinforcing structures include spar caps 36 and a shear web 38. In this embodiment, the blade 12 comprises two spar caps 36, which are associated respectively with the windward and leeward shells 26, 28 of the blade 12. The two spar caps 36 are arranged opposite one another in the region of maximum thickness of the airfoil profile (i.e. where the windward and leeward shells 26, 28 are furthest apart).

The shear web 38 is bonded between the spar caps 36. The spar caps 36 are integrated with the outer shell 24 of the blade 12. In this example the spar caps 36 are embedded within the structure of the outer shell 24. In other embodiments, the spar caps 36 may be bonded to inner surfaces 40 of the windward and leeward half-shells 26, 28.

The spar caps 36 in this example are of generally rectangular cross-section. The shear web 38 in this example is generally I-shaped in cross-section. These components may have other suitable shapes in other embodiments. The spar caps 36 and the shear web 38 are longitudinal elements, which extend longitudinally in the spanwise direction of the blade 12, i.e. transverse to the plane of the page in FIG. 2. Typically they extend along the whole or a majority of the length of the blade 12. Accordingly, for modern utility-scale wind turbines, these components may have lengths in excess of eighty metres.

In this embodiment, each spar cap 36 is formed from one or more pultruded strips of carbon-fibre reinforced plastic (CFRP). Preferably the spar caps 36 are each formed from a stack of pultruded strips 42, as will be described in further detail later.

It will be appreciated from FIG. 2 that the spar caps 36 are integrated with curved portions of the outer shell 24 of the wind turbine blade 12. In order for the spar caps 36 to integrate effectively with the blade shell 24, it is important that the spar caps 36 can conform to this curvature. As will now be described with reference to FIGS. 3a-4b, this presents challenges where relatively wide spar caps 36 are required, such as is the case for single-web blades such as the blade 12 shown in FIG. 2.

Figure 3A:
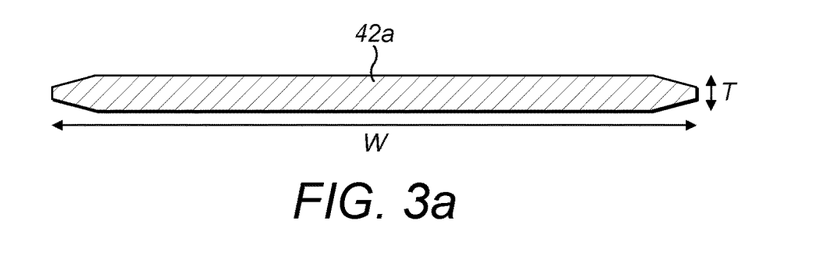
FIG. 3a schematically illustrates a relatively wide pultruded strip in transverse cross-section.

Referring to FIG. 3a, this shows a pultruded strip 42a of CFRP in transverse cross-section. The strip has a width W of approximately 330 millimetres, and a thickness T of approximately 5 mm. The strip 42a has a width W appropriate for a wide spar cap for a single-web blade, and is relatively wide in comparison to the width of pultrusions used to form existing narrower spar caps, which tend to be approximately half this width. Such existing spar caps may be found in dual-web blades, which include two pairs of spar caps spaced in the chordwise direction and bridged by a pair of shear webs. An example of a dual-web blade can be seen in FIG. 1 of WO2014079456.

Figure 3B:
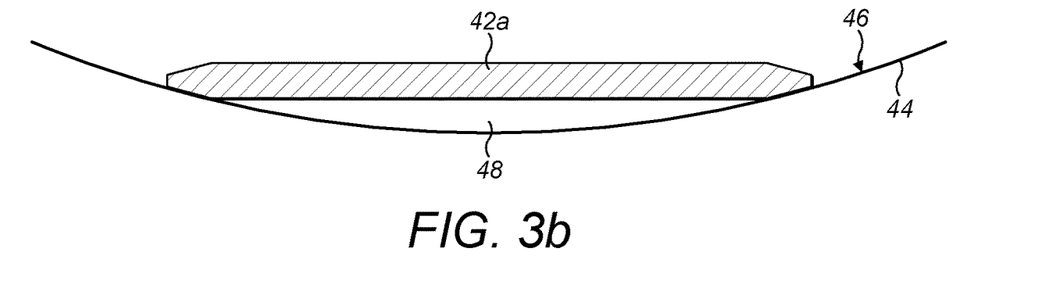
FIG. 3b schematically illustrates the relatively wide pultruded strip of FIG. 3a arranged in a curved mould, where the pultruded strip forms a bridge in the mould and does not conform to the curvature of the mould.

Referring to FIG. 3b, this schematically illustrates the relatively wide pultrusion 42a of FIG. 3a when arranged in a wind turbine blade mould 44. In order to define the curved profile of the blade, the mould surface 46 is concave-curved in transverse cross section. Due to its large width, the pultrusion 42a is not able to lie flush against the curved mould surface 46. Instead, the pultrusion 42a effectively forms a 'bridge' in the mould 44 and results in a large gap 48 beneath the pultrusion 42a between the pultrusion 42a and the mould surface 46. Such large gaps 48 should be avoided when laying up blade materials since they ultimately result in resin-rich pockets forming weaknesses in the blade structure. Accordingly, the wide pultruded strip 42a is not able to conform effectively to the curvature of the mould 44.

Figure 4A:
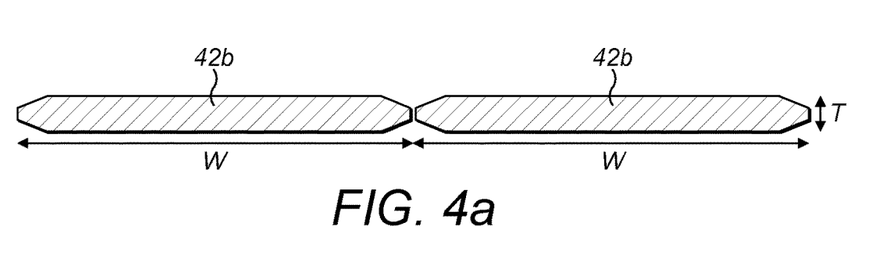
FIG. 4a schematically illustrates two relatively narrow pultruded strips in transverse cross-section.

FIG. 4a shows a pair of pultruded strips 42b of CFRP in transverse cross-section and arranged side-by-side. Each strip 42b has a width W of approximately 165 mm and a thickness T of approximately 5 mm. The combined width of the two pultrusions 42b is approximately 330 mm, i.e. approximately equal to the width of the relatively wide pultrusion 42a described above with reference to FIG. 3a.

Figure 4B:
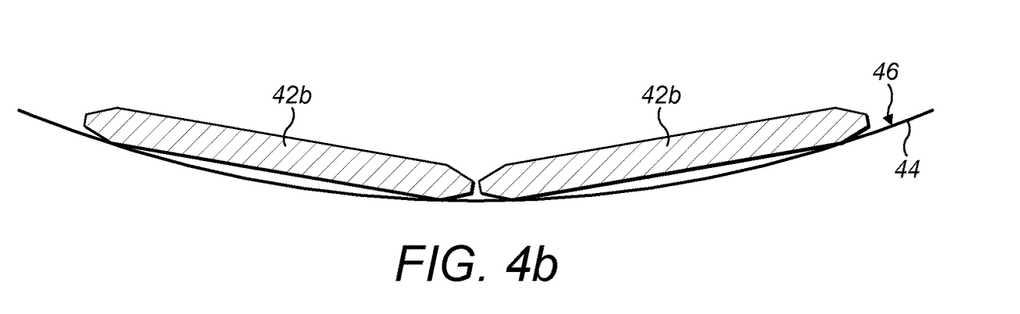
FIG. 4b schematically illustrates the two relatively narrow pultruded strips of FIG. 4a arranged side-by-side in a curved mould, the strips together conforming to the curvature of the mould.

Referring to FIG. 4b, this illustrates the two pultruded strips 42b of FIG. 4a when arranged side-by-side in a wind turbine blade mould 44. It can be seen that each pultrusion 42b is able to lie substantially flush or flat against the mould surface 46. Accordingly, the pultrusions 42b conform well to the curvature of the mould 44.

Whilst it is possible to form a wide spar cap 36 from multiple side-by-side pultrusions 42b, this is a relatively expensive solution. For example, the cost of producing two 'half width' pultrusions 42b is greater than the cost of producing a single 'full width' pultrusion 42a. The cost of handling, storing and laying-up multiple narrow pultrusions 42b is also greater than the cost of handling, storing and laying-up fewer wider pultrusions 42a.

The above discussion illustrates the problem that wide pultrusions 42a do not conform well to curved moulds and may form 'bridges' in the mould. Whilst narrower pultrusions can conform to the curvature of the mould, and can be used to form a wide spar cap 36, they are a relatively expensive solution. The present invention provides a cost-effective solution, which will now be described in further detail with reference to the remaining figures.

Figure 5A:
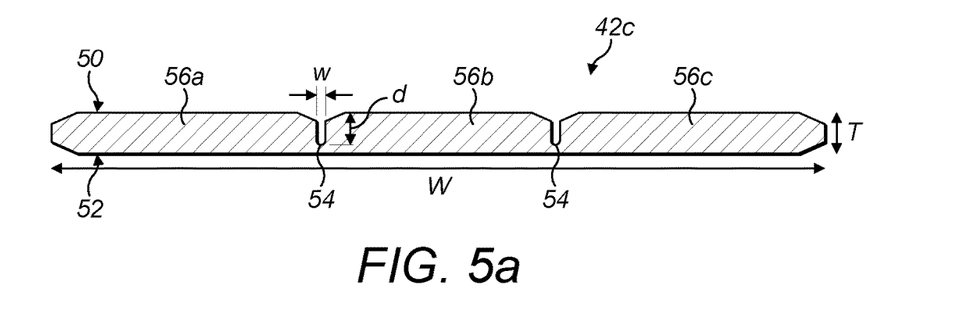
FIG. 5a schematically illustrates a pultruded strip according to an embodiment of the invention in transverse cross-section, the strip having a plurality of spanwise grooves.

FIG. 5a is a schematic transverse cross-sectional view of a pultruded strip 42c according to an embodiment of the present invention. The strip is made from CFRP. In this embodiment, the strip has a width W of approximately 330 mm and a thickness T of approximately 5 mm. As such, the strip 42c is relatively wide and has the same dimensions as the wide strip 42a described above with reference to FIG. 3a. It will be appreciated that these dimensions are not intended to be limiting and strips according to the invention having other suitable widths and thicknesses may be formed depending upon the particular requirements, for example the size, shape and structural requirements of a particular wind turbine blade or spar cap.

The pultruded strip 42c in FIG. 5a is substantially flat in cross-section and comprises upper and lower surfaces 50, 52 in the orientation of the strip 42c shown in FIG. 5a. The strip 42c comprises a plurality of longitudinally-extending grooves 54, which are also referred to as 'spanwise grooves'. The grooves 54 are defined in the upper surface 50 of the strip 42c. In this example, the strip 42c has two grooves 54, but in other examples the strip 42c may have a single groove or more than two grooves.

In this example, the grooves 54 serve to divide the cross-section of the strip 42c into three portions 56a-c of substantially equal width. However, in other embodiments, the grooves 54 may be located in other positions, such that the strip 42c may be divided into portions of unequal width.

The grooves 54 may have any suitable dimensions. In this example each groove 54 has a width 'w' of approximately 2 mm and a depth 'd' of approximately 3 mm. The depth d of a groove 54 therefore corresponds to approximately 60% of the thickness T of the strip 42c in this example. In other examples the grooves 54 may have a different depth d. Preferably, however, the depth d of a groove 54 is at least 50% of the thickness T of the strip 42c, and more preferably the groove 54 extends through a majority of the thickness T of the strip 42c. This advantageously imparts flexibility to the strip 42c allowing the strip 42c to be able to bend or flex along the grooves 54, as will now be described with reference to FIG. 5b.

Figure 5B:
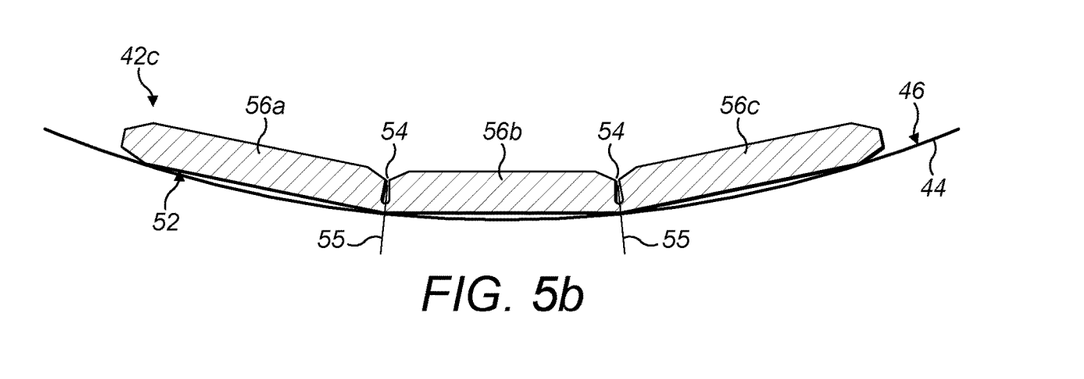
FIG. 5b schematically illustrates the pultruded strip of FIG. 5a arranged in a curved mould, where the strip is bent along the spanwise grooves and conforms to the curvature of the mould.

Referring to FIG. 5b, this schematically shows the pultruded strip 42c of FIG. 5a arranged in a curved mould 44, e.g. a wind turbine blade mould. In other embodiments the mould 44 may be a dedicated spar cap mould, for example. The strip 42c is bent along each groove 54, which allows the strip 42c to conform to the curvature of the mould 44. Specifically, in this example, the lower surface 52 of each of the three portions 56a-c of the strip 42c lies substantially flush with or substantially flat against the portion of the curved mould surface 46 beneath it. The spanwise grooves 54 impart chordwise flexibility to the pultruded strip 42c and allow the strip 42c to bend or flex along the grooves 54 to conform to the curvature of the mould 44.

Figure 5C:
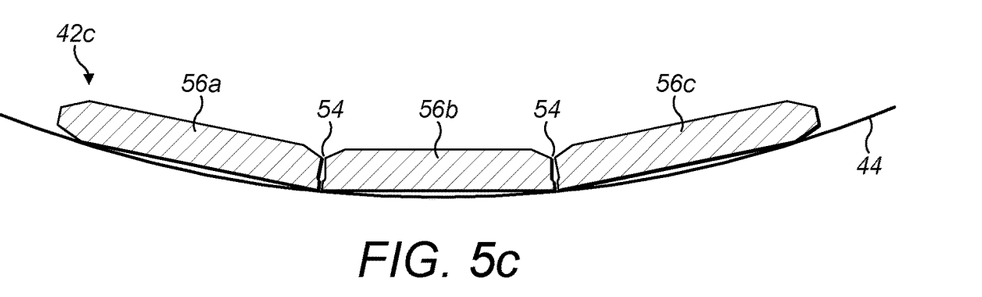
FIG. 5c schematically illustrates the pultruded strip of FIG. 5b where the curved strip is cracked along the spanwise grooves into multiple sections.

In some embodiments, bending the strip 42c along the grooves 54 may cause the strip to crack along the grooves 54, i.e. crack about the lines 55 indicated in FIG. 5b. As shown in FIG. 5c, the resulting cracked strip 42c may be divided into multiple separate sections 56a, 56b, 56c such that the cracked strip 42c conforms to the transverse curvature of the mould 44. The gaps between the sections 56a, 56b, 56c may advantageously fill with resin, for example during a subsequent resin infusion process, causing the cracks to 'heal'.

Figure 5D:
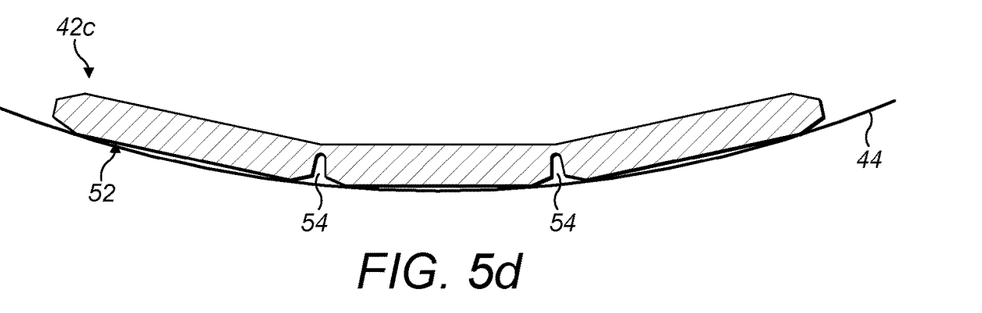
FIG. 5d schematically illustrates a pultruded strip according to an embodiment of the invention in transverse cross-section, the strip having a plurality of spanwise grooves formed in the lower surface of the strip.

Referring to FIG. 5d, in another embodiment the grooves 54 may be formed in the lower surface 52 of the strip 42c. It will be appreciated that this is equivalent to arranging the strip 42c in the mould 44 upside down, in comparison to orientation of the strip 42c shown in FIG. 5b. It can be seen that in this orientation, the strip 42c is still able to conform to the curvature of the mould 44 by bending (or cracking) along the grooves 54.

In this orientation of the strip 42c, the grooves 54 widen slightly at the mouths of the grooves when the strip flexes to conform to the transverse curvature of the mould 44.

Figure 6A:
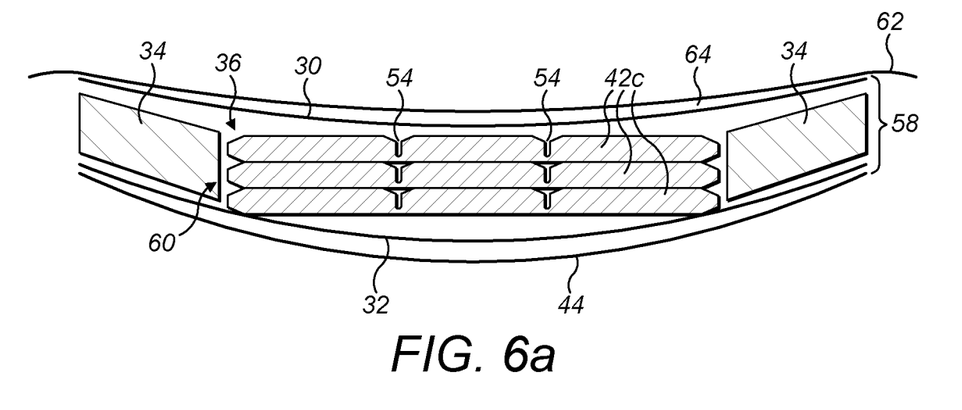
FIG. 6a schematically illustrates a stack of pultruded strips according to an embodiment of the invention arranged in a mould to form a reinforcing structure of a wind turbine blade.

FIG. 6a is a schematic partial transverse cross-sectional view of a wind turbine blade mould 44 and a layup 58 for a blade shell 24 (indicated in FIG. 2). The layup 58 comprises an outer skin layer 32, which may be formed, for example, from one or more layers of fabric material such as woven or non-woven glass-fibre fabric. A plurality of pultruded strips 42c with spanwise grooves 54 are stacked on top of the outer skin layer 32 to form a stack 60. The stack 60 forms a reinforcing structure of the blade, in this case a spar cap 36. Foam core material 34 may be arranged alongside one or both sides of the stack 60 of pultrusions 42c. An inner skin layer 30, e.g. comprising one or more glass-fibre fabric layers, is arranged on top of the stack 60 and the core material 34 to complete the layup.

There are three pultruded strips 42c in this example, but the stack 60 of pultrusions 42c may include any number of strips 42c in other embodiments. Alternatively a single strip 42c of suitable thickness may be used in other embodiments. In this example, each strip 42c is substantially identical to the strip 42c described above with reference to FIG. 5a. However, in other embodiments, the strips 42c may be different to the strip 42c in FIG. 5a. For example, they may have different dimensions to the strip 42c in FIG. 5a, and/or they may have a different number or configuration of grooves 54. The strips 42c in the stack 60 could also be different to one another according to the particular requirements.

It can be seen form FIG. 6a, that each strip 42c is substantially flat (i.e. not bent) when it is arranged in the mould 44. Accordingly, the strips 42c may initially form a bridge in the mould 44 similar to that described above with reference to FIG. 3b. The method of assembling the spar cap 36 in the mould 44 may therefore comprise stacking the strips 42c when flat to form a stack 60 of flat strips 42c in the mould 44. The strips 42c are easier to handle and stack when flat, so this provides an advantage during the layup process.

Once the constituent components of the blade shell have been laid up in the mould 44, the layup 58 is then then covered with a layer of vacuum bagging film 62. The vacuum bagging film 62 is sealed against suitable surfaces, for example against leading- and trailing-edge mould flanges (not shown) to form a sealed region 64 encapsulating the layup 58. A vacuum pump (not shown) is connected to the sealed region 64 and is used to remove air from this region. This causes the vacuum bagging film 62 to bear down against the layup 58.

Figure 6B:
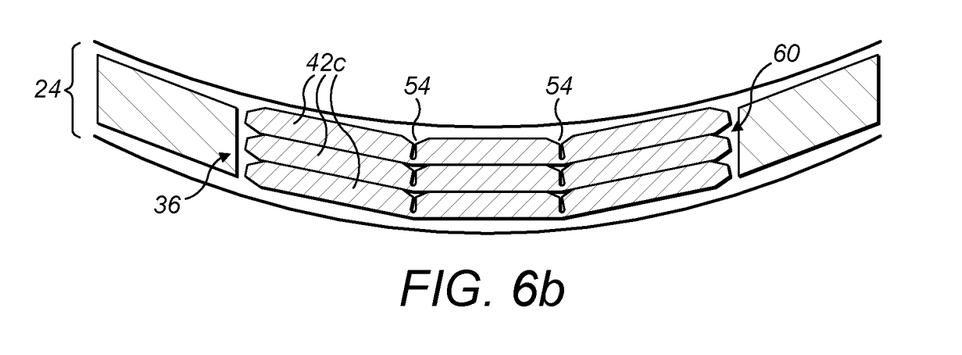
FIG. 6b schematically illustrates part of a wind turbine blade shell comprising a reinforcing structure according to an embodiment of the invention embedded in the shell structure.

The vacuum bag 62 contracts around the layup 58 and exerts a force on the layup 58, which causes the stacked pultruded strips 42c to bend along their spanwise grooves 54 (see FIG. 6b). The strips 42c therefore deform (i.e. bend) during the vacuum process to conform to the curvature of the blade mould 44. This is particularly advantageous since no manual intervention is required to bend the strips. However, in other embodiments the strips 42c could be bent using manual intervention if required.

With the vacuum maintained, resin (not shown) is supplied to the sealed region 64. The resin infuses throughout and in-between the various structural components and layers of the blade shell. Once cured, the resin forms a hard matrix that integrates the various components together. Heat may be applied to the layup 58 and/or mould 44 to accelerate the curing process.

Once the resin has cured, the vacuum bag 62 is removed and the wind turbine blade shell 24 is removed from the mould. The resulting blade shell 24, part of which is illustrated in FIG. 6b, comprises a spar cap 36 embedded within the shell structure. The spar cap 36 comprises a stack of pultruded strips 42c, each strip 42c having spanwise grooves 54, and each strip 42c being bent along the grooves 54 such that the strips 42c and the stack 60 conforms to the chordwise curvature of the blade shell 24.

In addition to allowing the pultruded strips 42c to conform to the curvature of the blade mould 44 (FIG. 6a), the grooves 54 advantageously enhance the resin-infusion process since they provide longitudinal channels or pathways for resin to flow between stacked strips 42c. This facilitates and enhances the permeation of resin between adjacent strips 42c in the stack 60 and hence improves bonding between the strips 42c.

In other embodiments, one or more of the stacked strips 42c may be orientated as shown in FIG. 5d, i.e. such that the grooves 54 are on the underside of the strip 42c.

This orientation of the strip(s) 42c provides a particular advantage, since the grooves 54 widen when the strip 42c flexes thereby maximising the space for resin to flow between stacked strips.

A method of making the pultruded strip 42c with spanwise grooves according to the invention will now be described with reference to FIGS. 7a-7c.

Figure 7A:
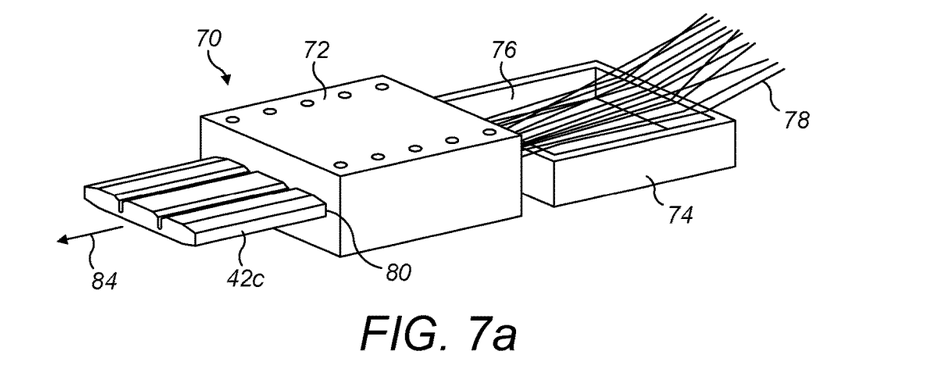
FIG. 7a illustrates a pultrusion process according to an embodiment of the invention for making pultruded strips according to embodiments of the present invention.

Referring to FIG. 7a, this shows a pultrusion apparatus 70 and process for forming pultruded strips according to embodiments of the invention. The pultrusion apparatus 70 comprises a heated pultrusion die 72 and a resin bath 74 containing liquid resin 76 such as epoxy resin. In this example, carbon fibres 78 are pulled through the resin bath 74 and coated in resin 76 before being pulled through the pultrusion die 72. The pultrusion die 72 defines an aperture 80 shaped to define the cross-sectional shape of the pultruded strips 42c.

Figure 7B:
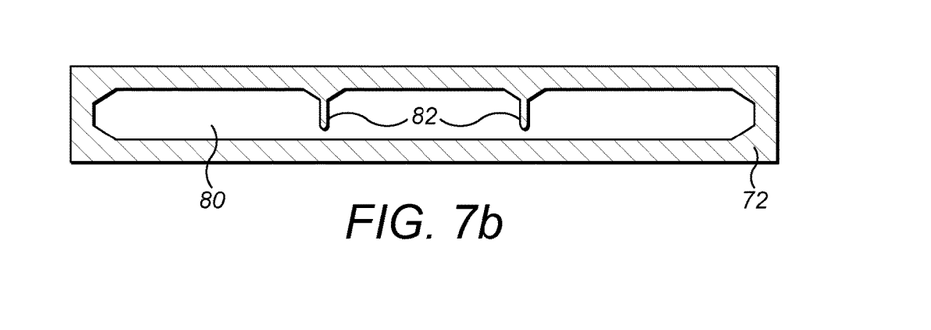
FIG. 7b is a schematic cross-section through a pultrusion die for use in the pultrusion process.
Figure 7C:
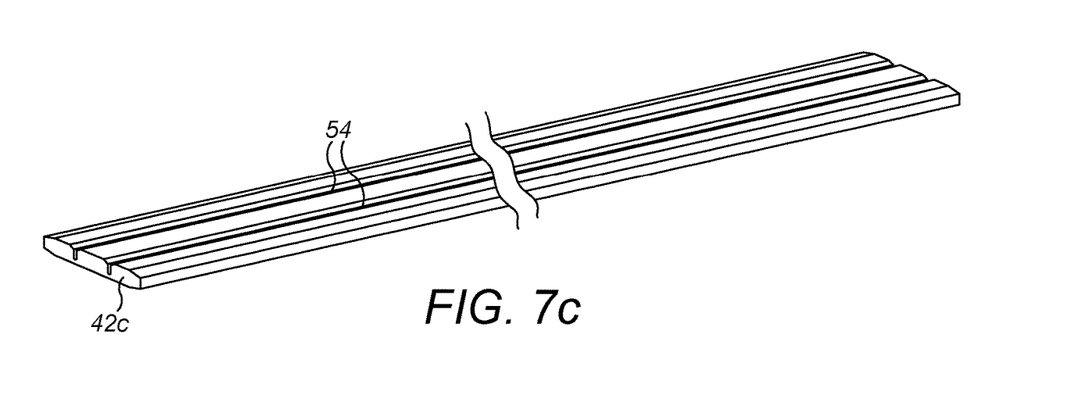
FIG. 7c is a schematic perspective view of a pultruded strip according to an embodiment of the invention.

Referring additionally to FIG. 7b, which is a cross-sectional view of the pultrusion die 72, it can be seen that the aperture 80 is substantially rectangular in shape. The pultrusion die 72 additionally includes groove-forming features 82. These features 82 protrude into the rectangular aperture 80. The formations 82 are shaped to define the cross-sectional shape of the grooves 54 in the pultruded strips 42c formed by the die 72.

The formations 82 are preferably dimensioned to form grooves 54 in the pultrusions 42c that have a depth of at least 50% of the thickness of the pultrusions 42c.

Referring again to FIG. 7a, the resin-coated carbon fibres 78 are pulled through the heated die 72 in the direction of the arrow 84. The die 72 shapes the fibres into a strip 42c with longitudinal grooves 54 whilst simultaneously curing the resin. Accordingly, the cured strip 42c emerges from the other side of the die.

The nature of the pultrusion process results in a strip 42c of uniform cross-section along its length with grooves 54 that extend along the full length of the strip. The resulting cured strip 42c with spanwise grooves 54 is shown in perspective view in FIG. 7c.

Aside from the initial tooling costs associated with the pultrusion die 72, the cost of producing pultruded strips with grooves 54 is substantially the same as producing strips of equivalent dimensions without grooves (such as the strip 42a described above with reference to FIG. 3a). Accordingly, the present invention allows relatively wide strips to be formed that are able to conform to a curved mould, thus representing an advantageously reduced-cost solution in comparison to the alternative of using multiple, narrower strips arranged side-by-side, as discussed above in relation to FIGS. 4a and 4b.

The above examples are provided for illustrative purposes only and are not intended to limit the scope of the invention as defined in the accompanying claims. Accordingly, many modifications may be made to the examples described above without departing from the scope of the invention defined in the claims. For example, strips of other dimensions and/or with other numbers or dimensions of grooves may be formed.

The invention claimed is:

1. A method of making a reinforcing structure for a wind turbine blade through a moulding process, the method comprising:
   providing an elongate mould extending in a longitudinal direction and defining a mould surface at least part of which is concave-curved in transverse cross section;
   arranging one or more pultruded strips in the mould to form the reinforcing structure, the one or more pultruded strips having one or more longitudinally-extending grooves; and
   bending and/or cracking the one or more pultruded strips along the one or more grooves such that the one or more pultruded strips substantially conform to the transverse curvature of the mould surface to define a plurality of planar strip portions, each of the plurality of planar strip portions having a lower surface that is closest to the mould surface, wherein the lower surface remains flat relative to the transverse curvature of the mould surface upon completion of the moulding process.

2. The method of claim 1, wherein the reinforcing structure is a spar cap.

3. The method of claim 1, comprising stacking a plurality of the pultruded strips in the mould to form a stack in which each strip is flat in transverse cross section; and bending and/or cracking the stack of strips in the mould along at least one groove of at least one strip such that the stack of strips conforms to the transverse curvature of the mould surface.

4. The method of claim 1, further comprising:
   at least partially covering the one or more pultruded strips with a vacuum bagging film to form a sealed region in the mould enclosing the one or more pultruded strips; and
   removing air from the sealed region such that the vacuum bagging film exerts a force on the one or more pultruded strips and causes the one or more pultruded strips to bend and/or crack along the one or more grooves.

5. The method of claim 1, wherein the mould is a wind turbine blade mould, and the method comprises forming the reinforcing structure in the mould integrally with a shell of the wind turbine blade.

6. The method of claim 1, wherein the one or more pultruded strips are made from fibre-reinforced polymeric material.

7. A method of making a reinforcing structure for a wind turbine blade through a moulding process, the method comprising:
- providing an elongate mould extending in a longitudinal direction and defining a mould surface at least part of which is concave-curved in transverse cross section;
- arranging one or more pultruded strips in the mould to form the reinforcing structure, the one or more pultruded strips having one or more longitudinally-extending grooves; and
- cracking the one or more pultruded strips along the one or more grooves such that the one or more pultruded strips substantially conform to the transverse curvature of the mould surface to define a plurality of planar strip portions upon completion of the moulding process.

* * * * *